US009477224B2

(12) United States Patent
Khan et al.

(10) Patent No.: US 9,477,224 B2
(45) Date of Patent: Oct. 25, 2016

(54) PHYSICS-BASED LIFESPAN MODELING

(75) Inventors: Khan Mohamed Khirullah Genghis Khan, Niskayuna, NY (US); Mohamed Ahmed Ali, Katy, TX (US); Ali Osman Ayhan, Karabuk (TR); Ajay Kumar Behera, Karnataka (IN); Anne Marie Isburgh, Cincinnati, OH (US); Vinay Bhaskar Jammu, Bangalore (IN); John Joseph Madelone, Jr., South Glens Falls, NY (US); Omprakash Velagandula, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1770 days.

(21) Appl. No.: 12/333,875

(22) Filed: Dec. 12, 2008

(65) Prior Publication Data

US 2010/0153080 A1 Jun. 17, 2010

(51) Int. Cl.
*G06G 7/64* (2006.01)
*G05B 23/02* (2006.01)

(52) U.S. Cl.
CPC ................... *G05B 23/0283* (2013.01)

(58) Field of Classification Search
CPC .................................... G05B 23/0283
USPC ......................................... 703/6–7
See application file for complete search history.

(56) References Cited

U.S. PATENT DOCUMENTS

| 5,018,069 | A | 5/1991 | Pettigrew |
| 6,067,486 | A | 5/2000 | Aragones et al. |
| 6,408,258 | B1 | 6/2002 | Richer |
| 6,728,610 | B1 | 4/2004 | Marshall et al. |
| 6,799,154 | B1 | 9/2004 | Aragones et al. |
| 6,823,675 | B2 | 11/2004 | Brunell et al. |
| 2005/0143956 | A1* | 6/2005 | Long et al. .................. 702/184 |
| 2007/0067114 | A1 | 3/2007 | D'Amato et al. |
| 2008/0140360 | A1 | 6/2008 | Gobel et al. |

FOREIGN PATENT DOCUMENTS

| GB | 2435534 A | 8/2007 |
| JP | H06180281 A | 6/1994 |
| JP | H10293049 A | 11/1994 |
| JP | 2007138921 A | 6/2007 |

(Continued)

OTHER PUBLICATIONS

Komorowski et al. "Life and Damage Monitoring-Using NDI Data Interpretation for Corrosion Damage and Remaining Life Assessments", RTO-MP-079(II), Oct. 2001, 14 pages.*

(Continued)

*Primary Examiner* — Suzanne Lo
(74) *Attorney, Agent, or Firm* — John P. Darling

(57) ABSTRACT

An embodiment of a method for lifespan modeling for a turbine engine component includes determining a design-phase model of the lifespan of an turbine engine component; fusing the design-phase model with sensor data collected during operation of the turbine engine component to produce an updated model of the lifespan of the turbine engine component; and fusing the updated model with data collected during an inspection of the turbine engine component to produce an overall model of the lifespan of the turbine engine component. Systems for lifespan modeling for a turbine engine component are also provided.

20 Claims, 6 Drawing Sheets

(56) References Cited

FOREIGN PATENT DOCUMENTS

| JP | 2007183929 A | 7/2007 |
|---|---|---|
| WO | 0218879 A1 | 3/2002 |

OTHER PUBLICATIONS

Goebel et al. "Fusing Competing Prediction Algorithms for Prognostics", Proceedings of 2005 IEEE Aerospace Conference, Dec. 2005, 10 pages.*
Messenger, N. "Operational Sense and Respond Logistics", CACI Inc Federal, Jun. 2003, 12 pages.*
Roemer et al. "Development of Diagnostic and Prognostic Technologies for Aerospace Health Management Applications", 2001, IEEE, pp. 3139-3147.*
John et al. "Incorporating Residual Stresses in Life Prediction of Turbine Engine Disks" 2001, 14 pages.*
Vukelich, Sharon. "Engine Life Extension through the Use of Structural Assessment, Non-Destructive Inspection, and Material Characterization" 2001, 6 pages.*
PCT/US2009/066315 Search Report, Apr. 14, 2010.
I.Y. Turner et al., "A Survey of Aircraft Engine Health Monitoring Systems," AIAA Joint Propulsion Conference, Aerospace Systems Condition Monitoring Session, No. AIAA-99-2828, XP-002575504, Jun. 1999, pp. 1-8.
PCT/US2009/066315 Written Opinion, Apr. 14, 2010.
Dr. Ronald L. Dehoff et al., IEEE Xplore, "Improved Flightline Diagnostics Using an eXpert MAiNtenance Tool (XMAN II)", [online]; [retrieved on Oct. 23, 2008]; retrieved from the Internet http://ieeexplore.ieee.org/iel2/150/3357/00112971.pdf?tp=&isnumber=112971.
G.J. Anders et al. "Probabilistic Evaluation of the Effect of Maintenance on Reliability—An application," IEEE Transactions on Power Systems, May 2, 2008, 576-583, 13, No. 2, IEEE.

* cited by examiner

PHYSICS-BASED LIFESPAN MODELING

BACKGROUND OF THE INVENTION

The present disclosure generally relates to monitoring and maintenance planning for turbine engines.

Accurate and cost-effective maintenance planning for turbine engines, such as aircraft engines, or turbines used for propulsion or power generation, requires precise predictions of the lifespan associated with critical degradation and failure modes of engine components. Existing design and maintenance practices focus on collection of operational, damage, and failure data from various sensors and from inspection of the engine as it operates in the field, and comparing the collected data to lifespan predictions made at the design stage. If the field performance data and predictions do not agree, future maintenance planning of the particular engine is based primarily on the collected field data, with a diminished role given to design stage predictions. Previous field experience with an engine having a similar design may also be used to predict an engine component's lifespan. However, a lack of agreement between the predicted lifespan of an engine component and the lifespan observed in the field diminishes the ability of the manufacturer to accurately forecast the actual lifespan of the engine component. As a result, increased cost to the engine manufacturer, reduced availability of the engine, and reduced revenue to the engine owner may occur.

One solution for this problem is diagnostics, prognostics, or health monitoring, which relies primarily on collected sensor data and fusion algorithms to combine the sensor data. Poor sensor performance may yield an inaccurate picture of the state of the engine component. Further, sensor data may not provide a picture of the underlying physics of any degradation that may be occurring in the engine. Data regarding the thermodynamics of the engine's operating cycle may be fused with the collected sensor data; however, the energy balance of the engine may not describe the forces and material response that may drive degradation of the engine component.

Accordingly, there remains a need in the art for a turbine engine component lifespan-prediction method combining design models, remote monitoring and diagnostic (RMD) data, and inspection data into a single, probabilistic, total lifespan predictive model.

BRIEF DESCRIPTION OF THE INVENTION

Disclosed herein are systems and methods for physics-based lifespan modeling for a turbine engine component. In one embodiment, a method for lifespan modeling for an turbine engine component includes determining a design-phase model of the lifespan of the turbine engine component; fusing the design-phase model with sensor data collected during operation of the turbine engine component to produce an updated model of the lifespan of the turbine engine component; and fusing the updated model with data collected during an inspection of the turbine engine component to produce an overall model of the lifespan of the turbine engine component.

An embodiment of a system for lifespan modeling for a turbine engine component includes a design-phase module configured to determine a design model of a lifespan of the turbine engine component; a remote monitoring and diagnostic module configured to collect sensor data during operation of the turbine engine component; an inspection module configured to collect data from inspection of the turbine engine component; and a model fusing module configured to update the design model with the sensor data and the inspection data to produce an overall model of the lifespan of the turbine engine component.

This disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION OF THE INVENTION

Lack of agreement between the predicted lifespan of turbine engine components and actual lifespan observed in field operation diminishes the ability of a manufacturer to accurately forecast the lifespan of engine components. Disagreement between design predictions and field data may occur in three scenarios. Design predictions, when they are manipulated probabilistically, may match the observed average behavior of the field data, but not the variation. Alternatively, the probabilistic design predictions may match the field variation, but not the average. Lastly, neither the average nor variation may match the probabilistic design prediction.

These mismatches may be due to insufficient physics simulations, or models, of critical variable variations from specific engine operation histories. Design computations and field data each explain some portion of the average lifespan and variation of a component. Through modeling that combines an existing or improved design model in conjunction with large sets of properly measured field sensor data, good matches may be achieved between actual and predicted lifespan and variation.

Embodiments of physics-based lifespan modeling provide a method to accurately forecast the lifespan of turbine engine components by making maximum use of available information regarding the components. Such embodiments may utilize and combine existing or improved physics models for component failure and damage, along with gathered RMD data, and crack and other damage measurements taken at inspection. A combined physics-based lifespan model may provide an accurate maintenance planning model for turbine engines through maximum utilization of design physics models, field sensor data, and inspection data.

Figure 1:
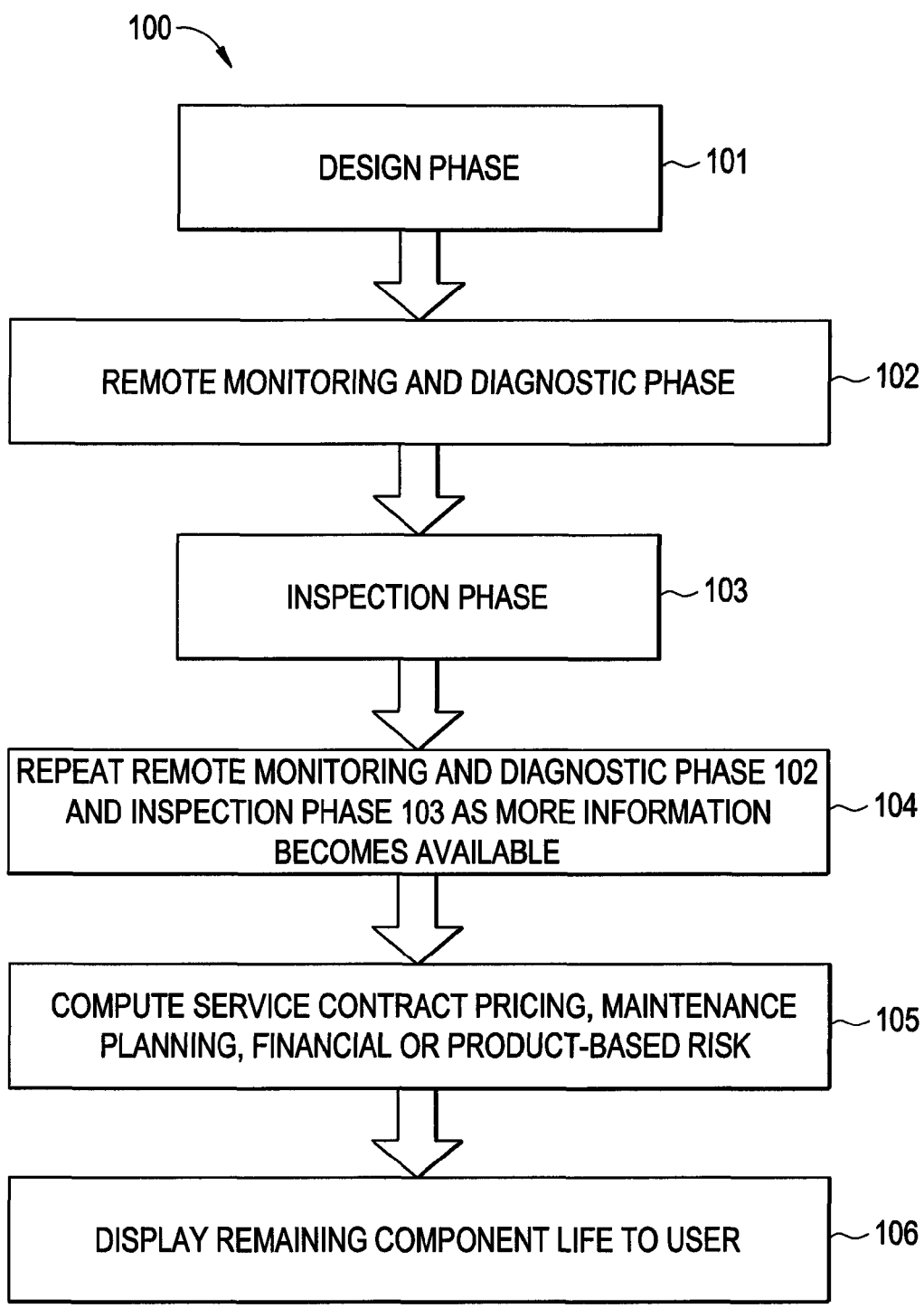
FIG. 1 shows a flowchart of an embodiment of method for physics-based lifespan modeling.

FIG. 1 shows a flowchart of a method 100 for physics-based lifespan modeling of a turbine engine component. Block 101 comprises a design phase, which is discussed in further detail below with regards to FIG. 2. Block 102 comprises a remote monitoring and diagnostic (RMD)

phase, which is discussed in further detail below with regards to FIG. 3. Block 103 comprises an inspection phase, which is discussed in further detail below with regards to FIG. 4.

Figure 2:
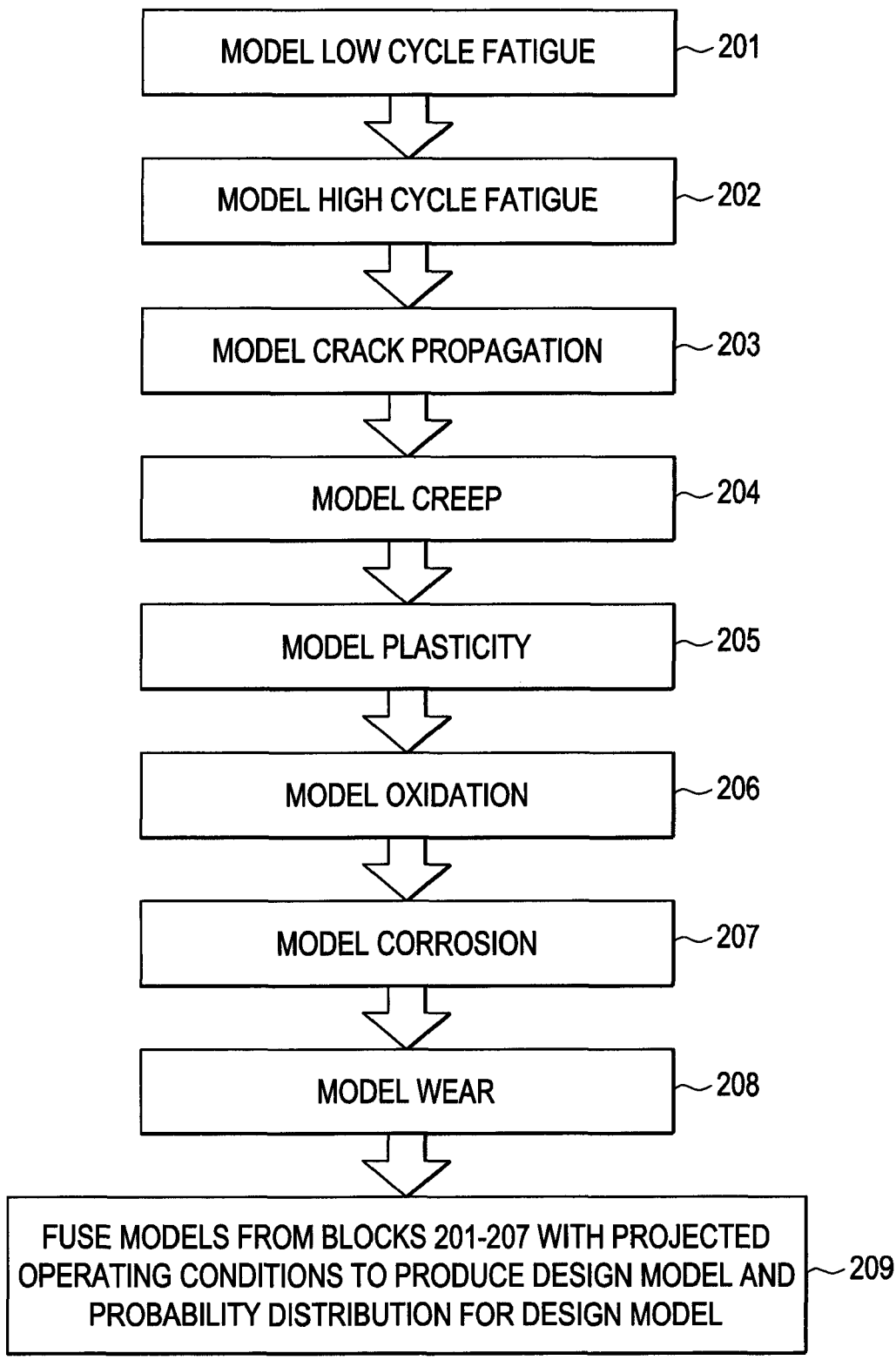
FIG. 2 shows a flowchart of an embodiment of a method for a design phase.

FIG. 2 shows an embodiment of a method 200 for a design, or new product introduction (NPI), phase 101. In block 201, detailed simulations and analyses are performed to model the low cycle fatigue (LCF) initiation lifespan of the component. In block 202, High Cycle Fatigue (HCF) initiation lifespan is modeled. Crack propagation lifespan of the component is modeled in block 203; 3-dimensional computer modeling of crack propagation may be used in some embodiments. The sum of LCF or HCF initiation lifespan and crack propagation lifespan may represent the total lifespan of a turbine engine component. Material behaviors of the component may also be modeled; in the embodiment of FIG. 2, creep is modeled in block 204, and plasticity is modeled in block 205. Failure modes may also be modeled. Oxidation is modeled in block 206, corrosion is modeled in block 207, and wear is modeled in block 208. The physics-based models created in steps 201-208 of design phase 101 may express thermal and structural design variables as functions of measurable or detectable component data, including but not limited to: stress, temperature, stress intensity factor, crack length, degree of damage due to oxidation, corrosion and wear, deformation, initiation life, crack propagation life, and damage accumulation life. The models produced in blocks 201 to 208 are fused with projected operating conditions for the turbine engine component, and the configuration of the engine, to yield a design model in block 209, which is an initial design-based probability distribution of component lifespan. As no field data for the specific component is available at the design phase, the probability distribution of the design model may have low confidence. However, the design model may be used to compute the initial price of service contracts and to develop maintenance plans, as early in the life of the turbine engine component, the design model reflects the best available information regarding the component's projected lifespan.

Figure 3:
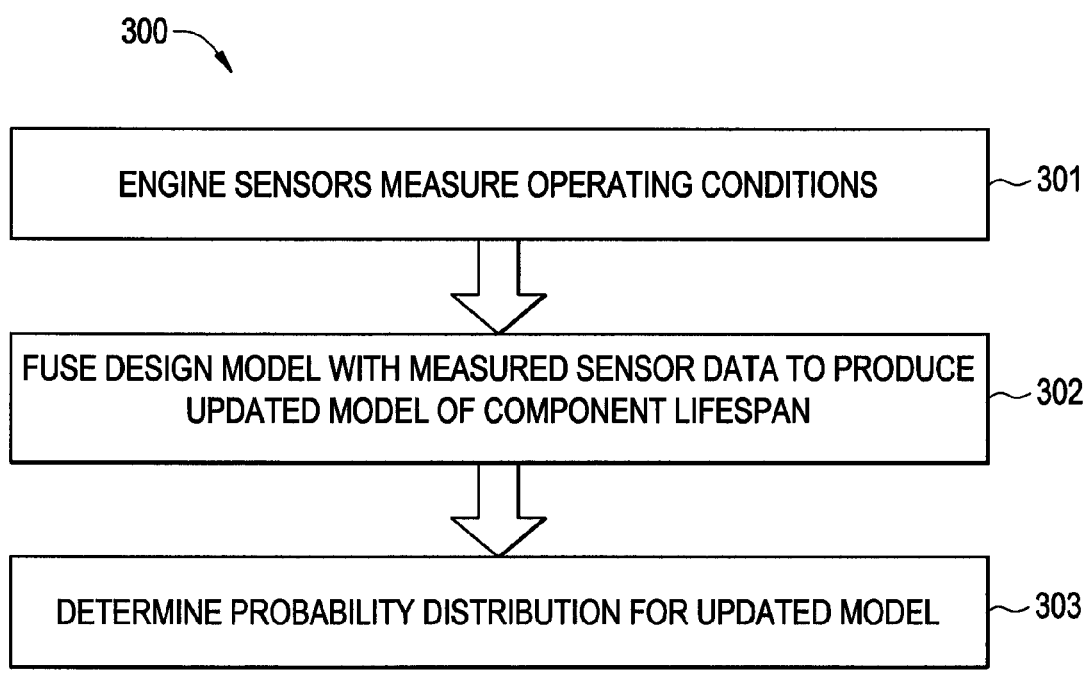
FIG. 3 shows a flowchart of an embodiment of a method for a remote monitoring and diagnostic (RMD) phase.

FIG. 3 shows an embodiment of a method 300 for a remote monitoring and diagnostic (RMD) phase. Referring to FIG. 3, during engine operation, engine sensors measure the operating conditions of the engine component in block 301. The sensor measurements include but are not limited to quantities such as operating temperature, pressure, motion, velocity, acceleration, and geometric clearances. The collected RMD data provides a unit specific usage profile for the engine component. The design model created in block 209 of FIG. 2 is fused with the RMD data in block 302. The resulting updated model reflects both the design model and the RMD data. This updated model may be used to determine a probability distribution of component lifespan in block 303 that represents both the physics and the usage profile of the component. The updated model of block 303 provides a more accurate and higher confidence prediction of the lifespan of the component than the design model of block 209.

Figure 4:
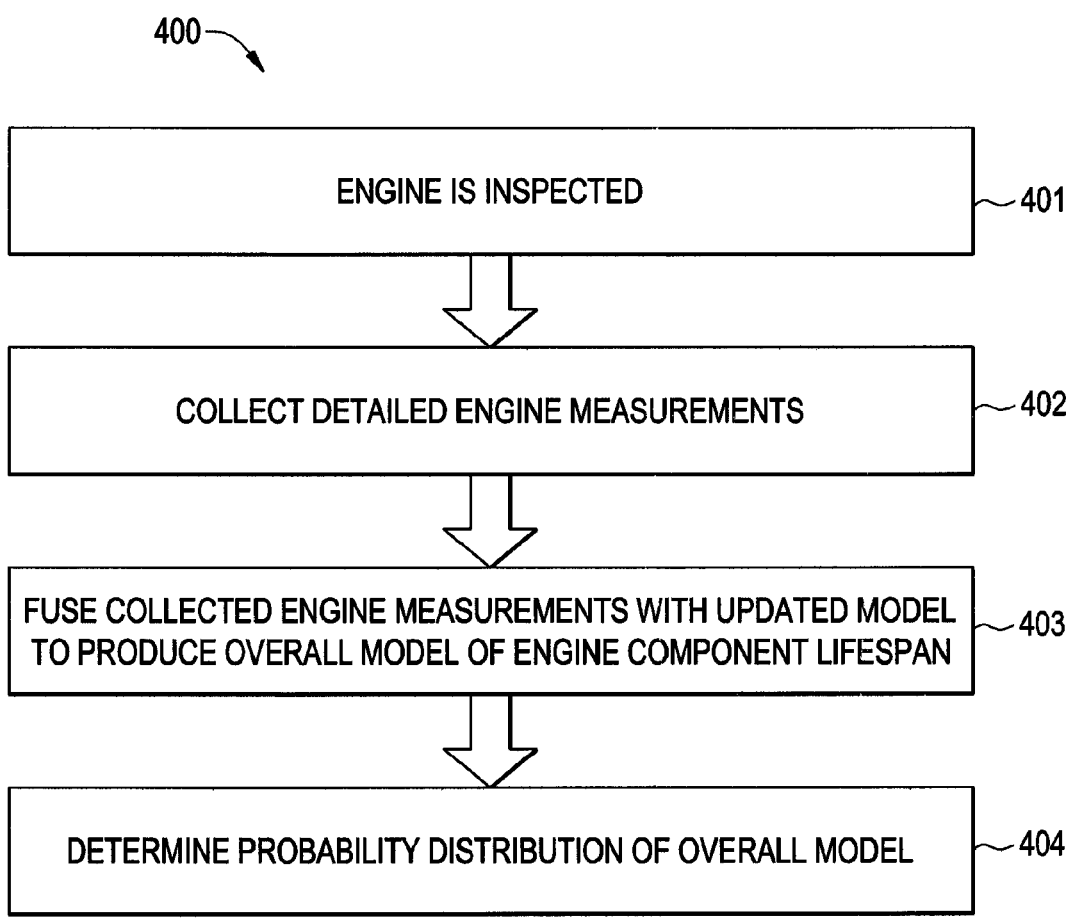
FIG. 4 shows a flowchart of an embodiment of a method for an inspection phase.

FIG. 4 shows an embodiment of a method 400 for an inspection phase. Referring to FIG. 4, after the engine has been in operation for a period of time, the engine and its components are inspected in block 401. Detailed measurements are taken of quantities that appear as the dependent variables in the physics-based models in the design phase (see FIG. 2, blocks 201-208) in block 402. Measured or detected quantities may include: stress, temperature, stress intensity factor, initiation life, crack propagation life, damage accumulation life, total lifespan of the component (time until certain damage state), observed crack lengths, degree of damage due to oxidation, corrosion and wear, deformation, and degradation of the component. The inspection measurements from block 402 are fused with the updated model from FIG. 3, block 302, in block 403. The overall model of block 403 may be used to determine a probability distribution of component lifespan in block 404, which, as the model reflects the design model, the RMD data, and the inspection measurements, provides the highest confidence regarding prediction of the component's lifespan.

Referring again to FIG. 1, the overall model of block 403 may be updated repeatedly as more RMD and inspection data becomes available during the life of the engine component in block 104, thereby increasing the confidence in the overall model. The overall model may be used to further optimize service contract pricing, maintenance planning, or other financial or contractual risk in block 105. Additionally, in block 106, the overall model may be used to construct a parts life dashboard in which the used or remaining life of a component may constantly computed and displayed to a user as the engine operating conditions change.

The combination of design models, RMD data, and inspection data into a single predictive model allows for maximum utilization of available information regarding the component, and for good component lifespan forecasting with high statistical and physical confidence.

Accurately calculating the design phase 101 model for a particular turbine engine component requires access to design information regarding the component from the component manufacturer. The maintenance interval may be specified to a customer based on an internal calculation of the cycles required to reach a certain crack length under the usage history of the engine, as opposed to making a recommendation based on sensor signatures or overhaul workscopes that have been historically applied to similar engines. In business terms, higher confidence forecasting allows for optimization of the cost of a maintenance and service contracts and scrap levels, which is critical to the customer. Cost savings may also be realized on determination of service shop visit workscopes and parts replacement strategies.

Figure 5:
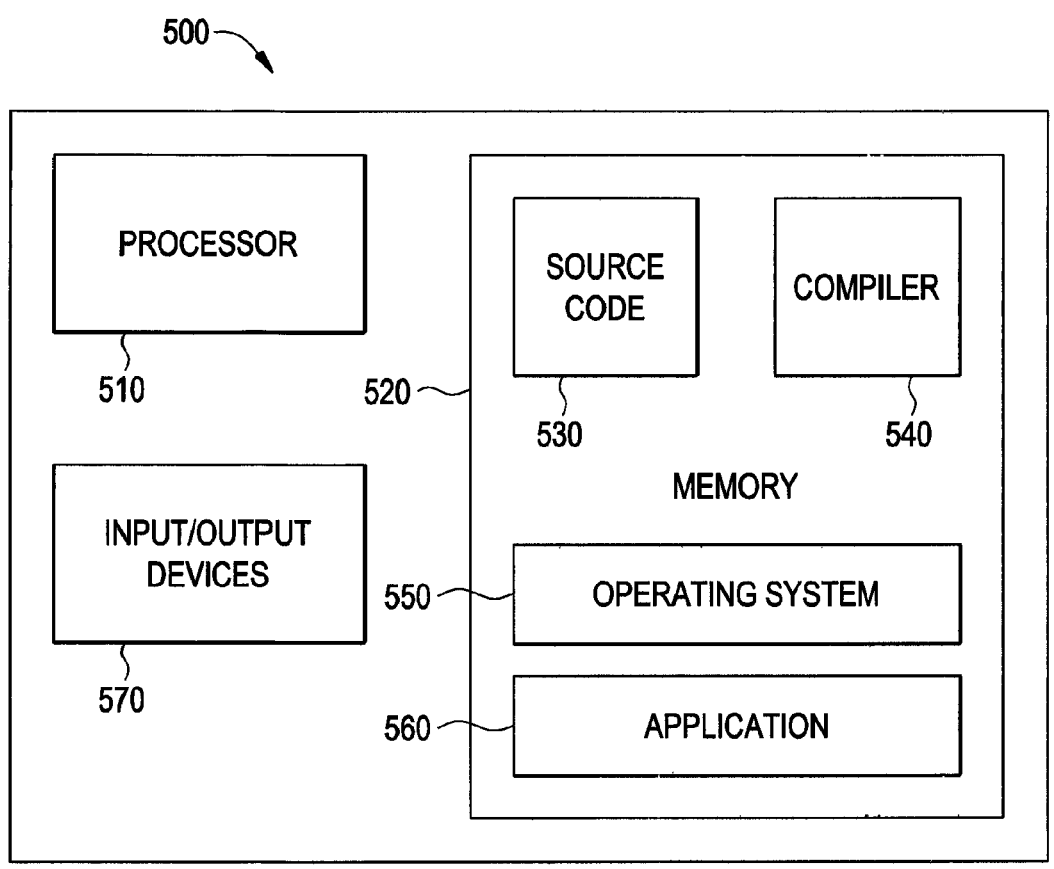
FIG. 5 shows an embodiment of a computer that may be used in conjunction with embodiments of physics-based lifespan modeling.

FIG. 5 illustrates an example of a computer 500 having capabilities, which may be utilized by exemplary embodiments of a method for physics-based modeling as embodied in software. Various operations discussed above may utilize the capabilities of computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
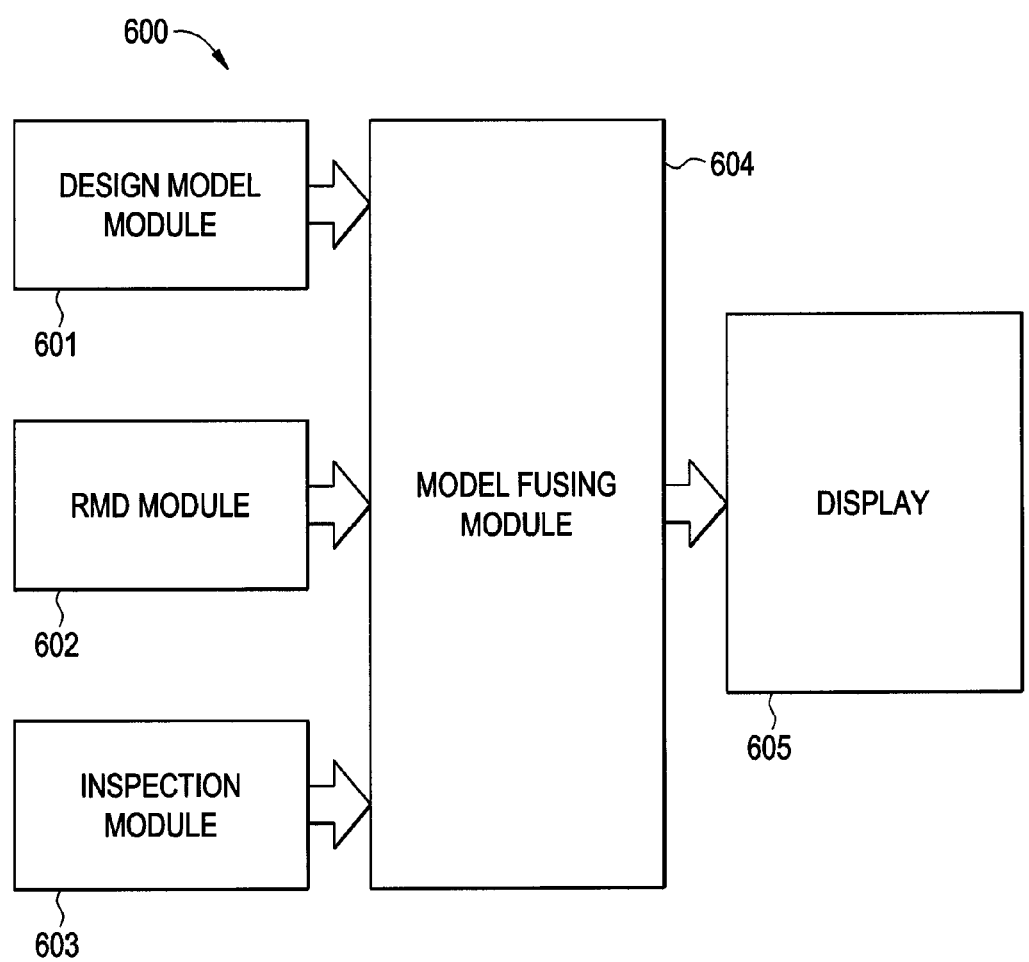
FIG. 6 shows an embodiment of a system for physics-based lifespan modeling.

FIG. 6 shows an embodiment of a system 600 for physics-based lifespan modeling that may incorporate one or more computers 500, such as is shown in FIG. 5. Design model module 601 may include a plurality of sub-modules to determine the models calculated in FIG. 2, blocks 201-208. The sub-modules (not shown) may model low cycle fatigue, high cycle fatigue, crack propagation, creep, plasticity, oxidation, corrosion, and wear. Design module 601 outputs determined modeling information to model fusing module 604. RMD module 602 collects engine sensor measurements as is shown in FIG. 3, block 301, and outputs measurement data to model fusing module 604. Inspection module 603 collects detailed inspection measurements as is shown in FIG. 4, block 402, and outputs the inspection data to model fusing module 604. Model fusing module 604 determines an overall model and probability distribution for the lifespan of the engine component using the inputs from design module 601, RMD module 602, and inspection module 603. The determined lifespan is displayed to a user at display 605.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular embodiment disclosed as the best mode contemplated for carrying out this disclosure, but that the disclosure will include all embodiments falling within the scope of the appended claims.

Also, the terms "first", "second", "bottom", "top", and the like do not denote any order, quantity, or importance, but rather are used to distinguish one element from another; and the terms "the", "a", and "an" do not denote a limitation of quantity, but rather denote the presence of at least one of the referenced items. The modifier "about" used in connection with a quantity is inclusive of the stated value and has the meaning dictated by the context or includes at least the degree of error associated with measurement of the particular quantity. Furthermore, all ranges reciting the same quantity or physical property are inclusive of the recited endpoints and independently combinable.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for lifespan modeling for a turbine engine component, the method comprising:
    determining a design-phase model of the lifespan of the turbine engine component by a computer, wherein the design-phase model comprises a plurality of physics-based models for the lifespan of the turbine engine component, the plurality of physics-based models comprising at least one of: low cycle fatigue, high cycle fatigue, crack propagation, creep, plasticity, oxidation, corrosion, and wear, and wherein the plurality of physics-based models are expressed as functions of turbine engine component data, the turbine engine component data comprising at least one of: stress, temperature, stress intensity factor, crack length, degree of damage due to oxidation, corrosion and wear, initiation life, crack propagation life, and damage accumulation life;
    determining an initial probability distribution of the lifespan of the turbine engine component based on the design phase model;
    fusing the design-phase model with sensor data collected during operation of the turbine engine component to produce an updated model of the lifespan of the turbine engine component by the computer, wherein the sensor data collected during operation of the turbine engine component comprises at least one of operating temperature, pressure, motion, velocity, acceleration, and geometric clearances;
    determining an updated probability distribution of a lifespan of the turbine engine component based on the updated model;
    fusing the updated model with data collected during an inspection of the turbine engine component to produce an overall model of the lifespan of the turbine engine component by the computer, wherein the data collected during the inspection of the turbine engine component corresponds to the turbine engine component data of the plurality of physics based models of the design-phase model; and
    determining an overall probability distribution of the lifespan of the turbine engine component based on the overall model.

2. The method of claim 1, further comprising fusing the overall model with sensor data collected during subsequent operation of the turbine engine component.

3. The method of claim 1, further comprising fusing the overall model with inspection data from a subsequent inspection of the turbine engine component.

4. The method of claim 1, wherein the plurality of physics-based models comprise low cycle fatigue, high cycle fatigue, crack propagation, creep, plasticity, oxidation, corrosion, and wear, and wherein the physics-based crack propagation model comprises a 3-dimensional computer model.

5. The method of claim 1, further comprising fusing the plurality of physics-based models into the design-phase model.

6. The method of claim 1, wherein the turbine engine component data comprises: stress, temperature, stress intensity factor, crack length, degree of damage due to oxidation, corrosion and wear, initiation life, crack propagation life, and damage accumulation life.

7. The method of claim 1, wherein the sensor data collected during operation of the turbine engine component comprises operating temperature, pressure, motion, velocity, acceleration, and geometric clearances.

8. The method of claim 1, wherein the data collected during an inspection of the turbine engine component comprises stress, temperature, stress intensity factor, crack length, degree of damage due to oxidation, corrosion and wear, initiation life, crack propagation life, and damage accumulation life.

9. The method of claim 1, wherein fusing the updated model comprises recalculating the updated model in terms of the data collected during inspection to produce the overall model.

10. The method of claim 1, further comprising computing at least one of service contract pricing, maintenance planning, or other financial or contractual risk based on the overall model.

11. The method of claim 1, further comprising displaying a projected turbine engine component lifespan based on the overall model to a user.

12. A computer program product comprising a non-transitory computer readable storage medium containing computer code that, when executed by a computer, implements a method for lifespan modeling for an turbine engine component, wherein the method comprises:
- determining a design-phase model of the lifespan of the turbine engine component by a computer, wherein the design-phase model comprises a plurality of physics-based models for the lifespan of the turbine engine component, the plurality of physics-based models comprising at least one of: low cycle fatigue, high cycle fatigue, crack propagation, creep, plasticity, oxidation, corrosion, and wear, and wherein the plurality of physics-based models are expressed as functions of turbine engine component data, the turbine engine component data comprising at least one of: stress, temperature, stress intensity factor, crack length, degree of damage due to oxidation, corrosion and wear, initiation life, crack propagation life, and damage accumulation life;
- determining an initial probability distribution of the lifespan of the turbine engine component based on the design phase model;
- fusing the design-phase model with sensor data collected during operation of the turbine engine component to produce an updated model of the lifespan of the turbine engine component by the computer, wherein the sensor data collected during operation of the turbine engine component comprises at least one of operating temperature, pressure, motion, velocity, acceleration, and geometric clearances;
- determining an updated probability distribution of a lifespan of the turbine engine component based on the updated model;
- fusing the updated model with data collected during an inspection of the turbine engine component to produce an overall model of the lifespan of the turbine engine component by the computer, wherein the data collected during the inspection of the turbine engine component corresponds to the turbine engine component data of the plurality of physics based models of the design-phase model; and
- determining an overall probability distribution of the lifespan of the turbine engine component based on the overall model.

13. The computer program product of claim 12, wherein the plurality of physics-based models comprise low cycle fatigue, high-cycle fatigue, crack propagation, creep, plasticity, oxidation, corrosion, and wear, and wherein the physics-based crack propagation model comprises a 3-dimensional computer model.

14. The computer program product of claim 12, further comprising fusing the plurality of physics-based models into the design-phase model.

15. The computer program product of claim 12, wherein the turbine engine component data comprises: stress, temperature, stress intensity factor, crack length, degree of damage due to oxidation, corrosion and wear, initiation life, crack propagation life, and damage accumulation life.

16. The computer program product of claim 12, wherein the sensor data collected during operation of the turbine engine component comprises operating temperature, pressure, motion, velocity, acceleration, and geometric clearances.

17. The computer program product of claim 12, wherein the data collected during an inspection of the turbine engine component comprises stress, temperature, stress intensity factor, crack length, degree of damage due to oxidation, corrosion and wear, initiation life, crack propagation life, and damage accumulation life.

18. The method of claim 1, further comprising computing an initial service contract cost for the turbine engine component based on the design-phase model.

19. The method of claim 18, further comprising updating the initial service contract cost for the turbine engine component based on the overall model.

20. The computer program product of claim 12, further comprising computing an initial service contract cost for the turbine engine component based on the design-phase model, and updating the service contract cost for the turbine engine component based on the overall model.

* * * * *